(12) United States Patent
Hart

(10) Patent No.: US 12,423,372 B2
(45) Date of Patent: *Sep. 23, 2025

(54) SYSTEMS AND METHODS FOR APPLICATION DATA AMALGAMATION

(71) Applicant: VERIFIED FIRST LLC, Meridian, ID (US)

(72) Inventor: Ryan Andrew Hart, Boise, ID (US)

(73) Assignee: Verified First LLC, Meridian, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,600

(22) Filed: Apr. 29, 2024

(65) Prior Publication Data

US 2024/0281492 A1    Aug. 22, 2024

Related U.S. Application Data

(63) Continuation of application No. 18/095,163, filed on Jan. 10, 2023, now Pat. No. 12,001,505, which is a continuation of application No. 16/503,036, filed on Jul. 3, 2019, now Pat. No. 11,580,189.

(60) Provisional application No. 62/712,869, filed on Jul. 31, 2018.

(51) Int. Cl.
| | |
|---|---|
| *G06F 16/958* | (2019.01) |
| *G06F 3/0484* | (2022.01) |
| *G06F 16/955* | (2019.01) |
| *H04L 9/32* | (2006.01) |

(52) U.S. Cl.
CPC ......... *G06F 16/958* (2019.01); *G06F 3/0484* (2013.01); *G06F 16/9566* (2019.01); *H04L 9/321* (2013.01)

(58) Field of Classification Search
CPC .. G06F 16/958; G06F 3/0484; G06F 16/9566; G06F 16/972; G06F 9/451; H04L 9/321
See application file for complete search history.

(56) References Cited

U.S. PATENT DOCUMENTS

| | | | |
|---|---|---|---|
| 7,191,435 B2* | 3/2007 | Lau | H04L 67/306 |
| | | | 717/121 |
| 7,526,771 B2* | 4/2009 | Roman | G06F 8/00 |
| | | | 719/330 |
| 10,331,502 B1 | 6/2019 | Hart | |
| 10,492,058 B2* | 11/2019 | Bleyl | H04W 8/18 |
| 11,128,679 B2* | 9/2021 | Gutta | H04L 67/53 |
| 11,580,189 B2 | 2/2023 | Hart | |
| 2004/0002944 A1 | 1/2004 | Hauser et al. | |

(Continued)

*Primary Examiner* — Nicholas R Taylor
*Assistant Examiner* — Tania M Pena-Santana
(74) *Attorney, Agent, or Firm* — Foley & Lardner LLP

(57) ABSTRACT

Systems and methods are disclosed for application data amalgamation through integration with third-party applications. A dynamic stub operates within a user interface application on a client computing device. The dynamic stub enables integration of functionality of an associated middleware system. The dynamic stub extracts data from a user interface of a third-party application system based on a set of data capture components. The dynamic stub transmits data to the middleware system. The middleware system transmits information back to the dynamic stub based on the data. The middleware system can reconfigure the dynamic stub in order to alter at least a portion of the user interface based on the information received from the middleware system.

20 Claims, 11 Drawing Sheets

(56) References Cited

U.S. PATENT DOCUMENTS

2004/0006653 A1     1/2004  Kamen et al.
2005/0050228 A1*    3/2005  Perham .................. H04L 67/56
                                                    709/246
2011/0314092 A1*   12/2011  Lunt .................... G06F 16/958
                                                    715/234
2019/0356754 A1*   11/2019  Sahoo ................... H04L 69/02

* cited by examiner

FIG. 5B

| Candidates | Locations | Departments | Positions | Status | More ▾ |
|---|---|---|---|---|---|
| Name | ID | Position | | Status | |
| VF Citizen, Jane | 0938 | Sales Manager | | Rejected | |
| VF Kleen, Joe | 1689 | Sales Manager | | Applied | |
| VF Tofer, Chris | 4006 | Technician I | | Offered | |
| VF Wilder, Norman | 2281 | Technician III | | Applied | |

FIG. 6C

SYSTEMS AND METHODS FOR APPLICATION DATA AMALGAMATION

RELATED APPLICATIONS

This application is a continuation of U.S. patent application Ser. No. 18/095,163, titled SYSTEMS AND METHODS FOR APPLICATION DATA AMALGAMATION, filed Jan. 10, 2023, which is a continuation of U.S. patent application Ser. No. 16/503,036, titled SYSTEMS AND METHODS FOR APPLICATION DATA AMALGAMATION, filed Jul. 3, 2019, which claims priority to U.S. Provisional Patent Application No. 62/712,869, titled SYSTEMS AND METHODS FOR APPLICATION DATA AMALGAMATION, filed Jul. 31, 2018, each of which is incorporated herein by reference in its entirety.

TECHNICAL FIELD

The present disclosure relates to systems and methods for interfacing and/or integrating with one or more disparate applications or application systems. In particular, the present disclosure relates to systems and methods for interfacing and/or integrating or amalgamating data within a third-party application system via data exported or extracted from the third-party system webpage or other user interface.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIG. 5B is an illustration of the user interface of FIG. 5A with a dynamic stub, according to an embodiment of the present disclosure.

FIG. 6C is the user interface of FIG. 6B with a data aggregation region provided by the dynamic stub, according to an embodiment of the present disclosure.

DETAILED DESCRIPTION

Figure 1:
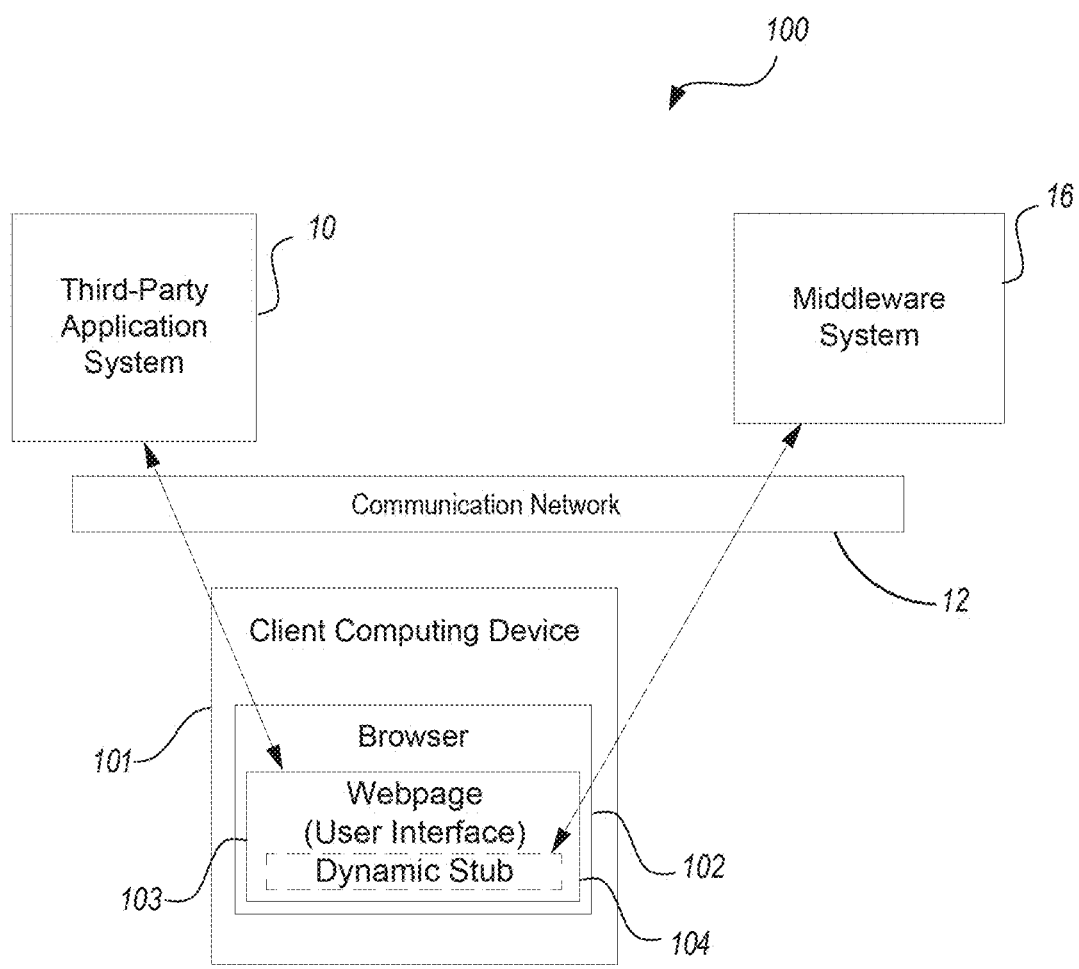
FIG. 1 is a system diagram of an application data amalgamation system ("ADAS") for integrating with third-party applications, according to an embodiment of the present disclosure.

Companies frequently use applicant tracking software (ATS), payroll software, human capital management software, healthcare information management software, or other software (collectively referred to herein as third-party applications or third-party systems) that may track progress of an individual (e.g., employees or applicants) or other object or entity. Oftentimes, the various third-party applications integrate with a vendor service to provide other services in addition to the services provided by the third-party applications. For example, some third-party applications may integrate with a vendor, based on a customer request, to provide the ability to order a report on a person, such as a background check, directly within the third-party applications.

However, the provider of a given third-party application generally controls which vendors are allowed to integrate into the given third-party application. Examples of vendor-provided services include recruiting, performance of background checks, credit report checks, personality assessments, video interviewing, I-9 employment verification/validation, drug screening, on-boarding, employee monitoring, benefits administration, job boards and job posting etc.

Integration between third-party application providers and vendors often takes an extended period of time and runs a risk of either the third-party application provider or the vendor backing out of the integration. Further, vendors are required to be proficient in multiple third-party applications to integrate and build the vendor systems to operate properly and appropriately within the third-party applications. This may require a vendor to build to the third-party applications' specifications, configure to the third-party applications' specifications, and support the client using that third-party applications' integration. It may be desirable to have a standard integration across all of the third-party application platforms. That is, it may be desirable to bypass third-party application integration and/or permission. Embodiments of the present disclosure allow a customer to access a vendor service from within a third-party application or third-party application platform without a need for an API integration between the third-party application and the vendor service.

Client refers to an entity, such as a company or corporation, which may establish a relationship with another entity whereby the second entity, in exchange for monetary or other consideration, provides a service to the first entity.

Client user refers to an employee of a client acting on behalf of the client/employer.

Transaction refers to an interaction between a client and a service provider whereby the service provider may provide a service to the client in exchange for monetary or other consideration. More particularly, a transaction in the scope of the present disclosure is a data exchange between client and service provider which may incur a financial charge against the client and in favor of the service provider for the provision of a data service, such as in a software-as-a-service (SAAS) model.

Control component refers to a set of instructions in machine readable format and corresponding display artifact (s), the combination of which provides a user with a means to interact with a page displayed on a computing device display to trigger a pre-defined behavior. By way of example without limitation, a control component may include text, a hypertext link, one or more variables, regular expressions, input style instructions (such as, among others, radio-button, check box, numeric field, text field, etc.), graphical components such as buttons or icons, behavior controls (such as on load, on hover, on click, etc., or the equivalents in any relevant code or markup language), code or markup elements, etc. Examples of user interactions with the control component include hover (or hover on, mouse enter, etc.) (wherein the user places a cursor, such as a mouse cursor) within a defined region for the control component, click (wherein the user places the cursor within a defined region for the control component and presses a physical button, such as a mouse button or a key on a keyboard), hover off or mouse leave (wherein the user causes the cursor to leave a defined region of the control component). Examples of behavior include without limitation load another page; reload the current page (refresh); send data to a defined recipient, such as another user, or a fully qualified network address (iPV4, iPV6 or other computing device identifier, port identifier, etc.); menu display; submenu display; etc.

Set of components refers generally to one or more components wherein each software component is a data-capture related component, a data-containing component (with or without its related data/datum), or a formatting component. A data-capture component is configured to identify, capture, collect, and/or transmit data from the user interface to a middleware system. A data containing-component is received from a middleware system and is configured to insert or otherwise perform a function on or with a data item, such as a variable, and may include data or a datum for the particular component. A formatting component is received from a middleware system and may include machine-readable instructions to alter, adjust, modify or change a portion of a user interface. By way of example without limitation, a set of components may comprise a regular expression template, a section of JavaScript®, a hidden class of a markup language, or other functionality for identifying an element (e.g., ID, Class/Name, etc.) of a user interface (e.g., a webpage) and extracting or otherwise obtaining the value or other data associated with the element. etc.

Application refers generally to a software system installed on a computing device, or a computing device network, to execute programmatic instructions and other computing functions. Examples of applications include word processors, accounting packages, games, etc.

Applicant may refer generally to a real person, a human, seeking employment with a company, corporation, or other entity. More particularly, an applicant can be a person seeking employment with a client as defined above.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The terms "a" and "an" can be described as one, but not limited to one. For example, although the disclosure may recite an interface having "a button," the disclosure also contemplates that the interface can have two or more buttons.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Reference is now made to the figures in which like reference numerals refer to like elements. For clarity, the first digit of a reference numeral may indicate the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail to avoid obscuring aspects of the embodiments. Furthermore, the described features, structures, or characteristics may be combined in any suitable manner in one or more embodiments.

FIG. 1 is a system diagram of an application data amalgamation system ("ADAS") 100 for integrating with third-party applications, according to an embodiment of the present disclosure. The ADAS 100 may allow a vendor service to interface with a third-party application system 10. More particularly, the ADAS 100 may allow a vendor service (e.g., via a middleware system 16) to interface with a third-party application system 10 providing a user interface 103 to/on a client computing device 101. The ADAS 100 includes at least the client computing device 101 having a browser 102 and in communication via a communication network 12 with the third-party application system 10 and a middleware system 16.

The browser 102 may be a software application (or a layer or module of a software application) resident on the client computing device 101 serving as the user interface 103 between a user and the third-party application system 10. For ease of convenience, the description herein refers to using services, protocols, applications, etc., generally related to the Internet; however, any appropriate network schema, protocols, etc., may be employed. The browser 102 may be a publicly available so-called "Internet browser" or "World Wide Web browser," such as, for example, e.g., Google Chrome™, Microsoft® Internet Explorer®, Microsoft® Edge, Apple® Safari®, Mozilla® FireFox®, etc.

The ADAS 100 includes a dynamic stub 104, which may be inserted into a webpage to operate with the browser 102 on the client computing device 101. The dynamic stub 104 is associated with the middleware system 16. The dynamic stub 104 may comprise a section of page markup code (not shown), such as, e.g., Oracle® Javascript®, PHP: Hypertext Preprocessor (PHP), Hypertext Markup Language (HTML), etc. The dynamic stub 104 is to operate within a user interface (e.g., a webpage) of a third party application system to be presented for a user (e.g. a client user) viewing on a client computing device. The dynamic stub 1-4 is configurable to a first state to provide data to the middleware system 16 and reconfigurable by the middleware system 16 from the first state to a subsequent state to alter at least a portion of the user interface and to provide additional data to the middleware system 16. In a first state, the dynamic stub 104 may be configured such that the dynamic stub 104 does not cause a human discernable component to appear on the webpage into which the dynamic stub 104 is placed. In a subsequent state, the dynamic stub 104 may be configured by the middleware system 16 to display various elements, such as text, control elements, graphics, etc., on the webpage in the browser 102 on the client computing device 101. The dynamic stub 104 may integrate through the browser 102 with the user interface 103 without interacting directly with the third-party application system 10. In other words, the dynamic stub 104 may access information provided to the user interface 103 by the third-party application system 10 even though the dynamic stub 104 does not necessarily communicate with the third-party application system 10.

In at least one embodiment, the dynamic stub 104 may allow a client user to access an unintegrated vendor service (e.g. via the middleware system 16) while remaining on (e.g., or from within the context of) a third-party application system 10 user interface 103 (such as, for example, a webpage). In another embodiment, the dynamic stub 104 may allow a client user to access the same or similar functionality with the vendor service (middleware system 16) integrated to the third-party application system 10. In other words, the middleware system 16 may be autonomous from the third-party application system 10, or the middleware system 16 may be integrated to, or contiguous, with the third-party application system 10. (In such an embodiment, integrated or contiguous includes, for example, the concept of distributed computing.) In one embodiment, the functionality of the middleware system 16 may be fully integrated within the architecture of the third-party application system 10 such that the service of the middleware system 16 is an available service within the third-party application system 10. The dynamic stub 104 of the ADAS 100 on the client computing device 101 may extract data from the user interface 103 of the third-party application system 10 based on, by way of example without limitation, a regular expression template, a JavaScript® component, a hidden class of a markup language, etc. The dynamic stub 104 may allow data to be transmitted from the client computing device 101 to the middleware system 16, and the dynamic stub 104 may receive information from the middleware system 16. The dynamic stub 104, in some states, may influence the appearance of at least a portion of the user interface 103 (browser 102) based on the information received from the middleware system 16. The user interface 103 on the client computing device 101 may allow communication via the communication network 12 with the third-party application system 10 to request and retrieve information from the third-party application system 10, and to display the returned information via the user interface 103, while the dynamic stub 104 may access the information returned from the third-party application system 10 to the user interface 103. The ADAS 100 may enable interfacing with information from the third-party application system 10, via the user interface 103, while not communicating with a back-end computing device (e.g., a server) of the third-party application system 10. The dynamic stub 104 may be installed or otherwise integrated into the Internet browser 102 by presenting a control object or other interface within the user interface 103 of the third-party application system 10. Interfacing with application data of the third-party application system 10 may allow amalgamation of application data from the third-party application system 10 with related data of the middleware system 16.

In one embodiment, the dynamic stub 104 may take the form of:

```
<!-- XYZ Stub -->
<script>
(script src="https://www.xyz.com/widget/src/app/iframe.js" async defer);
</script>
<!-- End XYZ Stub -->
```

In one embodiment, a collection of pre-defined variables may be mapped in the user interface, for example as in a hidden class of a markup language, such as the following without limitation:

```
<div id="xyz-vars">
    <div class="hidden">
        <input type="hidden" id="individual-id" value="eb94d16f-12ce-406d-99ab-a84d00af4eea">
        <input type="hidden" id="individual-first-name" value="John">
        <input type="hidden" id="individual-last-name" value="Applicant">
        <input type="hidden" id="individual-middle-name" value="A">
        <input type="hidden" id="individual-suffix" value="Jr.">
        <input type="hidden" id="individual-email" value="JohnApplicant@gmail.com">
        <input type="hidden" id="individual-date-of-birth" value="01/01/1975">
        <input type="hidden" id="individual-address-line-1" value="1550 S Tech Lane Suite 200">
        <input type="hidden" id="individual-address-line-2">
        <input type="hidden" id="individual-address-city" value="Meridian">
        <input type="hidden" id="individual-address-region" value="ID">
        <input type="hidden" id="individual-address-postal-code" value="83642">
        <input type="hidden" id="individual-address-postal-country" value="US">
        <input type="hidden" id="user-firstname" value="George">
        <input type="hidden" id="user-lastname" value="Washington">
        <input type="hidden" id="user-email" value="George@FirstPresident.com">
        <input type="hidden" id="user-phone" value="818-555-1212">
        <input type="hidden" id="user-company" value="United States of America">
        <input type="hidden" id="user-misc1" value="Optional Data">
        <input type="hidden" id="user-misc2" value="Optional Data">
        <input type="hidden" id="user-misc3" value="Optional Data">
    </div>
</div>
```

Figure 2:
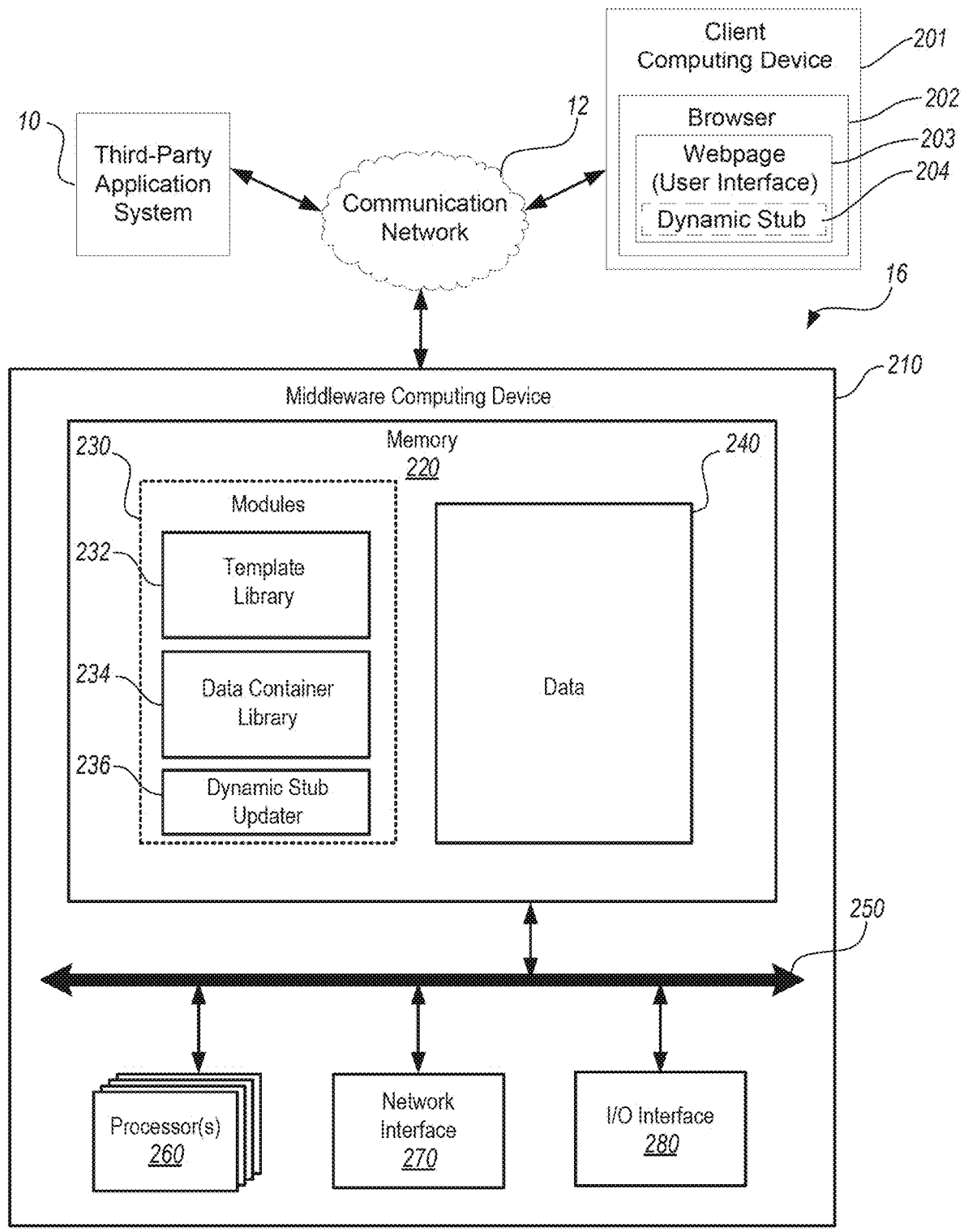
FIG. 2 is a block diagram of a middleware computing device of the middleware system of FIG. 1, according to an embodiment of the present disclosure.

FIG. 2 is a block diagram of a middleware computing device 210 of the middleware system 16 of FIG. 1, according to an embodiment of the present disclosure. The middleware computing device 210 can include a memory 220, one or more processors 260, a network interface 270, an input/output interface 280, and a system bus 250.

The one or more processors 260 may include one or more general purpose devices, such as an Intel®, AMD®, or other microprocessor. The one or more processors 260 may include a special purpose processing device, such as ASIC, SoC, SiP, FPGA, PAL, PLA, FPLA, PLD, or other customized or programmable device. The one or more processors 260 can be configured to perform distributed (e.g., parallel) processing to execute or otherwise implement functionalities of the presently disclosed embodiments. The one or more processors 260 may run a standard or custom operating system and perform operating system functions. It is recognized that any operating systems may be used, such as, for example, Microsoft® Windows®, Apple® MacOS®, Disk Operating System (DOS), UNIX, IRJX, Solaris, SunOS, FreeBSD, Linux®, fliM® OS/2® operating systems, and so forth.

The memory 220 may include static RAM, dynamic RAM, flash memory, one or more flip-flops, ROM, CD-ROM, DVD, disk, tape, or magnetic, optical, or other computer storage medium. The memory 220 may include a plurality of program modules 230 and data 240. The memory 220 may be local to the middleware computing device 210, as shown, or may be distributed and/or remote relative to the middleware computing device 210.

The modules 230 may include all or portions of other elements of the middleware computing device 210. The modules 230 may run multiple operations concurrently or in parallel with or on the one or more processors 260. In some embodiments, portions of the disclosed modules, components, and/or facilities may comprise executable instructions embodied in hardware or in firmware, or stored on a non-transitory, machine-readable storage medium, such as the memory 220. The instructions may comprise computer program code that, when executed by a processor and/or computing device, cause a computing system (such as the processors 260 and/or a client computing device 201) to implement certain processing steps, procedures, and/or operations, as disclosed herein. The engines, modules, components, and/or facilities disclosed herein may be implemented and/or embodied as a driver, a library, an interface, an API, FPGA configuration data, firmware (e.g., stored on an EEPROM), and/or the like. In some embodiments, portions of the engines, modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 220 may also include data 240. Data generated by the middleware computing device 210, such as by the modules 230, may be stored on the memory 220, for example, as stored data 240. The stored data 240 may be organized as one or more databases. In one embodiment, the data 240 may be stored in a database system. The database system may reside within the memory 220. In one embodiment, the data 240 may be remote, such as in a distributed computing and/or storage environment. For example, the data 240 may be stored in a database system on a remote computing device.

The input/output interface 280 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 270 may facilitate communication with other computing devices and/or networks and/or other computing and/or communications networks. The network interface 270 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 270 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 250 may facilitate communication and/or interaction between the other components of the system, including the one or more processors 260, the memory 220, the input/output interface 280, and the network interface 270.

The dynamic stub 204 may be inserted into a webpage by the middleware computing device 210 to be displayed by the browser 202 operating on a client computing device 201. The particular webpage displayed in the browser 202 on the client computing device 201 and having the dynamic stub 204 may contain applicant data. The dynamic stub 204 may capture any applicant data within the webpage displayed in the browser 202 of the client computing device 201, and may interact with the middleware system 16 to send and receive applicant data to/from the middleware system 16, and to influence the appearance of at least a portion of the webpage displayed with the browser 202 according to information received from the middleware system 16. In other words, the dynamic stub 204 is to obtain at least one data capture-related component based on one or more characteristics of the user interface that is provided to the client computing device 201 by the third-party application system 10.

The program modules 230 of the middleware computing device 210 may include a template library 232, a data container library 234, and a dynamic stub updater 236. The template library 232 may comprise a collection of sets of components which may be used to extract data from the user interface 203, for example, one or more regular expression templates. Each regular expression template (or other set of components) may correspond to a particular third-party application system 10. The data container library 232 may comprise a collection of page markup language components. Each page markup language component may comprise one or more elements. Each element may configure (a) datum/data for appropriate interpretation for display, interaction, etc., within the particular target webpage. In other words, each page markup language component may configure the datum/data for use within a particular webpage's markup regime, such as, for example, HTML, PHP, Javascript®, Cascading Style Sheet (CSS), etc., including formatting of display and interaction. In some embodiments, the template library 232 and data container library 234 may be a combined library. The dynamic stub updater 236 may, in one embodiment, serve to compile together any elements needed to update the dynamic stub 204 from one state to a subsequent state. For example, the dynamic stub updater 236 may receive a regular expression template from the template library 232 and embed the regular expression template within any other elements necessary for transmission to the client computing device 201 such that the dynamic stub 204 may receive the regular expression template and employ the template appropriately within the context of the particular webpage (user interface) 203 in the browser 202.

The dynamic stub 204 may be changeable by the middleware computing device 210. In one state, the dynamic stub 204 may indicate to the middleware computing device 210 which regular expression template or other set of components the dynamic stub 204 may need in order to, in a subsequent state, capture the application data within the user interface 203 and to send the application data to the middleware computing device 210. The middleware computing device 210 may send the appropriate template to the dynamic stub 204, thereby changing the dynamic stub 204 to be able to capture the application data within the user interface 203. The dynamic stub 204 may then capture the application data within the user interface 203 and send it to the middleware computing device 210. The middleware computing device 210 may then send to the dynamic stub 204 an amalgamation of application data, along with formatting instructions from the data container library 234 to enable the dynamic stub 204 to display the amalgamated data within the user interface 203 in the browser 202 of the client computing device 201. The formatting instructions sent to the dynamic stub 204 may include control elements, such as, e.g., interactive buttons, menus, hyperlinks, etc. The dynamic stub 204 may allow a variety of user interactions based on the data received from the middleware computing device 210.

The set of components provided by the middleware computing device 210 can determine and/or specify which fields in the user interface 203 for the dynamic stub 204 to parse to identify and extract and/or export the desired information and data. For example, a regular expression template of a known third-party application system 10 user interface 203 may be configured to identify which fields provide the data needed for a report to be compiled from the middleware system 16 (and/or a vendor service). For example, the regular expression template may identify which fields provide, for example, a name of a person, a physical address, an email address, date of birth, a social security number, etc., and extract and/or export that data. At least some of the data is extracted or otherwise exported to automatically populate data fields in the dynamic stub 204. For example, the dynamic stub 204 may automatically populate with a person's name and email address and provide a control component for a client user to order a report on the person from the middleware system 16, as discussed in more detail below. The embodiments, however, are not limited to only populating a name and email address. Any information parsed from fields of a third-party application system 10 user interface 103 may be automatically populated to corresponding fields of the dynamic stub 204.

The dynamic stub 204 may communicate via the communication network 12 with the middleware system 16. The middleware system 16 may provide one or more additional services that augment the service provided by the third-party application system 10 by updating the dynamic stub 204 with the appropriate template(s) and/or data container(s) and relevant data. In other words, the middleware system 16 may be a vendor service or vendor service system to provide data service(s) related to but distinct from the data service(s) nominally available through the third-party application system 10. The middleware system 16 provides these services without direct integration with the third-party application system 10. In at least one embodiment, the middleware system 16 provides service independent from, but in the context of, the third-party application system 10 via the dynamic stub 204.

In at least one embodiment, the middleware system 16 may be hosted on a communication network 12 remote to the client computing device 101 hosting the ADAS 100. In another embodiment, the middleware system 16 may be hosted on a network which also hosts the client computing device 201.

The middleware system 16 can be accessed through the communication network 12 by the dynamic stub 204 through the browser 202. For example, the middleware system 16 may be stored, implemented, and/or otherwise operating on a remote computing device. The remote computing device can also be distinct and/or remote from the third-party application system 10. The browser 202 and the dynamic stub 204 may be hosted and/or executed on a client user's system, which may be a client computing device 201.

Once the dynamic stub 204 has extracted data from the browser 202, the dynamic stub 204 may transmit the data to the middleware system 16. The dynamic stub 204 may also receive information from the middleware system 16. The dynamic stub 204 may modify at least a portion of the webpage displayed in the browser 202 based on the information received from the middleware system 16.

Figure 3:
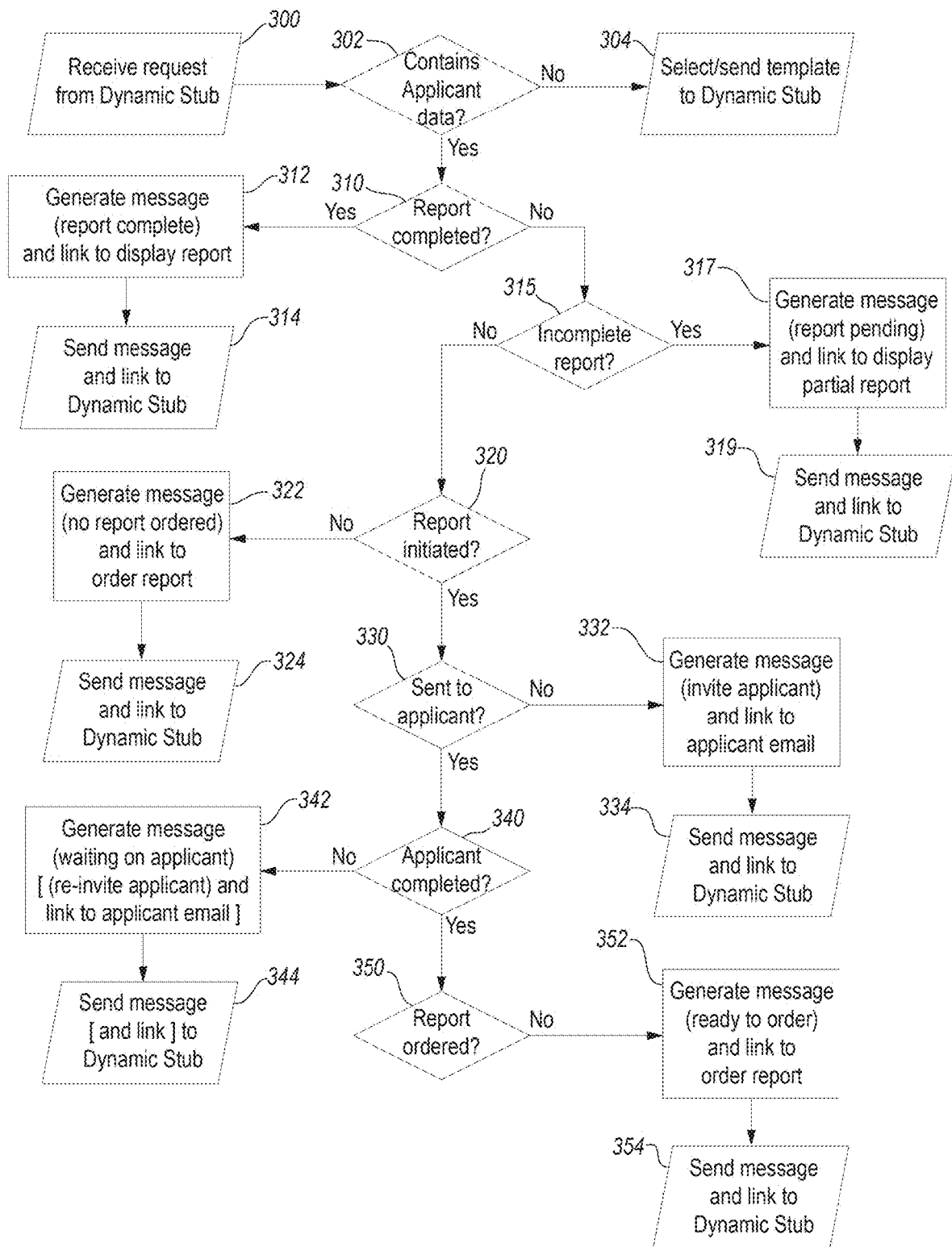
FIG. 3 is a flowchart for the operation of the middleware system of FIGS. 1 and 2, according to an embodiment of the present disclosure.

FIG. 3 is a flowchart for the operation of the middleware system 16 of FIGS. 1 and 2, according to an embodiment of the present disclosure. The middleware system 16 receives 300 data from the dynamic stub (see 104 in FIG. 2). The data from the dynamic stub 104 may contain, for example, a request for a template, or applicant application data (applicant data). The middleware system 16 determines 302 if the data from the dynamic stub 104 includes applicant data. If the data from the dynamic stub 104 does not contain applicant data, the middleware system 16 may select an appropriate template from the template library (see 232 in FIG. 2) and send 304 the template to the dynamic stub 104. If the data received from the dynamic stub 104 includes applicant data, the middleware system 16 determines 310 if a report for the applicant data has been completed. If the report has been completed, the middleware system 16 generates 312 a message indicating the report has been completed, along with a control element (link) to allow the user to view the completed report, then sends 314 the message and link to the dynamic stub 104. If the report has not been completed, the middleware system 16 determines 315 if a partially complete report is available. If a partially complete report is available, the middleware system 16 generates 317 a message indicating the report is pending and a control element (link) to display the partial report, then sends 319 the message and link to the dynamic stub 104. If no incomplete report exists, the middleware system 16 determines 320 if the report has been initiated.

Reports are initiated when completed forms from an applicant have been received. In some embodiments, the forms are received in the middleware system 16 through a push notification (e.g., email notification, SMS notification, desktop notification, mobile app notification). In at least one embodiment, an applicant may be invited to complete the form(s) which may lead to report initiation. If the report has not been initiated, then the middleware system 16 generates 322 a message indicating the report has not been ordered, along with a control element (link) to order a report, and sends 324 the message and link to the dynamic stub 104.

If the report has been initiated, the middleware system 16 determines 330 if the applicant has been sent a request (invitation) to complete applicant portion(s) of the application. If the applicant has not been invited to complete the applicant's portion, the middleware system 16 generates 332 a message for the user to invite the applicant to complete the applicant's portion(s) and a control element (link) to send the invitation to the applicant, and sends 334 the message and link to the dynamic stub 104.

In at least one embodiment, a client user may enter the data which may lead to report initiation. If the report has been initiated and an invitation is sent to an applicant to provide information (e.g., see input component 658a in FIG. 6C), the middleware system 16 determines 340 if enough data (applicant has/has not completed applicant portion(s) of the application) has been entered to prepare a report. If the applicant has not completed the applicant portion(s) of the application (not enough information to initiate report), the middleware system 16 generates 342 a message that the ADAS is, effectively, waiting on the applicant. In one embodiment, the waiting-on-applicant message may include a control element (link) to re-invite the applicant to complete the applicant portion(s) of the application. The middleware system 16 then sends 344 the wait-on-applicant message (and the link, in such an embodiment) to the dynamic stub 104.

If the applicant has completed the applicant portion(s) of the application (the ADAS 100 has enough information to begin the report), the middleware system 16 determines 350 if the report has been ordered. If the report has not been ordered, the middleware system generates 352 a message that report is ready to order and a control element (link) by which the user may order the report, and sends 354 the message and link to the dynamic stub 104.

Figure 4:
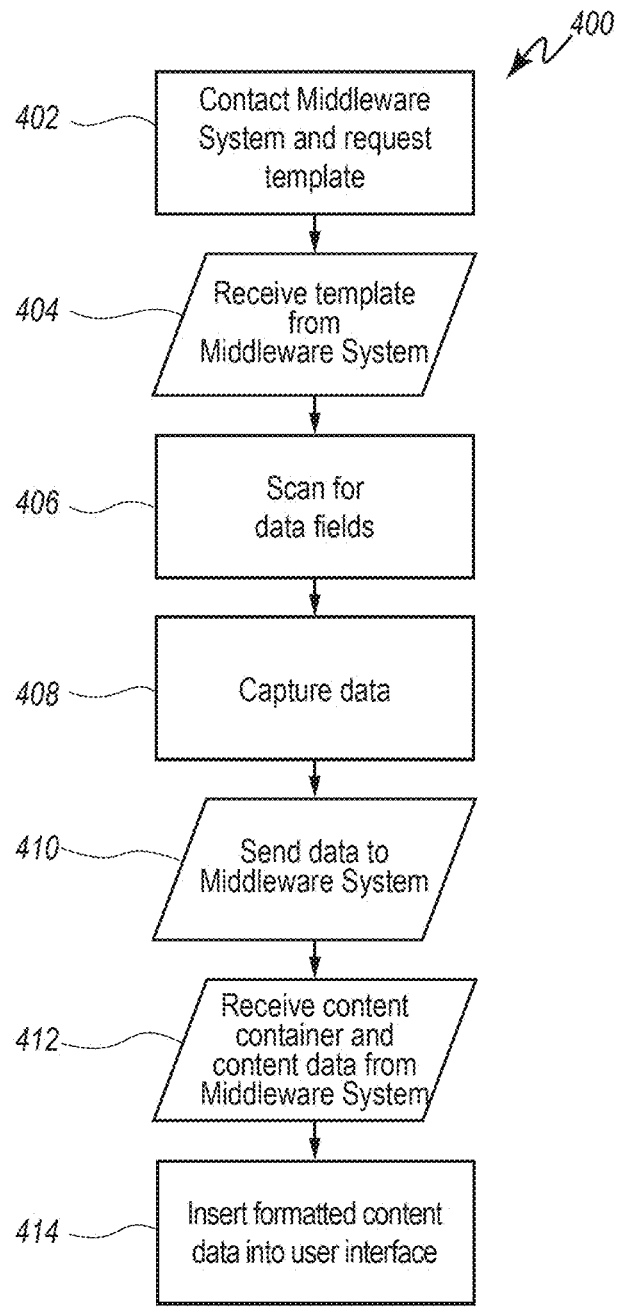
FIG. 4 is a flowchart of a method of operation of a dynamic stub such as the dynamic stub of FIG. 1, according an embodiment of the present disclosure.

FIG. 4 is a flowchart of a method 400 of operation of a dynamic stub such as the dynamic stub 104 of FIG. 1, according an embodiment of the present disclosure. The dynamic stub 104 may be a component of a webpage displayed in a browser of a client computing device 101 (see FIG. 1). In a first state, the dynamic stub 104 may be configured with, for example, a webpage identifier and other data to facilitate communication with the middleware system 16 (see FIGS. 1-2). When the webpage is displayed in the browser 104, the dynamic stub 104 in the first state may contact 402 the middleware system 16 and request a template. The middleware system 16 may determine a set of components, such as, for example, a regular expression template configured for the particular webpage, which the dynamic stub 104 may use to scan the webpage and send the template to the dynamic stub 104. The dynamic stub 104 achieves a second (or subsequent) state once the template is received 404 from the middleware system 16. In the second (or subsequent state), the dynamic stub 104 may be configured by the template to scan 406 the webpage to identify data fields related to an applicant application, and to capture 408 the data related to each of the fields of the applicant application. The dynamic stub 104 can use the set of components to recognize specific data (e.g., text, images, values, fields) of the webpage (e.g., within the webpage display/control language, such as HTML). The dynamic stub 104 may scan 406 for and capture 408 data of the webpage based on the set of components. The dynamic stub 104 sends 410 the data to a middleware system (such as the middleware system 16 of FIG. 1). The dynamic stub 104 then receives 412 a message and control component from the middleware system 16 and displays 414 the message and control component to the client user.

The dynamic stub 104 may change the appearance of an icon (not shown, but see 560 in FIG. 5B) based on the message and/or control component received from the middleware system 16. For example, the icon 560 may turn gray if no report is ordered, yellow if a report is pending, and green if the report is completed. This allows a client user to quickly determine the status of a report for a person who is listed currently in the third-party application user interface 103 by merely looking at the icon 560 of the dynamic stub 104. The dynamic stub 104 may be configured to alter the user interface 103 by identifying a section of page markup language of the webpage and inserting a new additional section of page markup language. The new additional section of page markup language may modify an operation of a control component, such as, for example, to present in a configured color, to perform a configured function (e.g. execute given instructions) upon selection/activation, to transmit extracted information to the middleware system 16, etc. Relatedly, the dynamic stub 104 may be configured to suppress an identified section of page markup language.

The dynamic stub 104 may also modify the user interface 103 to include the message and/or control component received from the middleware system 16 to enact the next step in the process based on the status. The message may include page markup language to inject the message on the user interface that is being presented to a user. The message and/or control component may be presented as a button, for example, that a user can press (e.g., click). The message and/or control component may say, for example, "Order Background Check," if a report has not yet been ordered; "Results pending" if the report is not yet complete; or "View Results," if the report is complete. The client user may select the control component, and the control component will perform the desired function based on the status of the report. For example, the control component will either order the background check or show the results of the report to the user. In some embodiments, if the report is pending, the control component may allow a user to make modifications to the ordered report or see a partial report. In other embodiments, a message is sent without a control component if the report is pending.

When the dynamic stub 104 receives 412 the message and control component from the middleware system 16 to order a report, the client user is presented with two options if the client user selects to order a report. The client user may elect to email (or use another push notification, such as SMS text message, to) the applicant for authorization to order the report, or the client user may elect to order an instant report (for example, if the applicant has previously authorized the report). If the client user elects to email the applicant, the middleware system 16 generates and sends an email to the applicant based on the data to complete the disclosure and authorization forms, as well as enter any necessary personal identifying information. Once the applicant completes the applicant forms, the middleware system 16 gathers the necessary information to prepare the report. If the client user elects to order an instant report, the dynamic stub 104 requests the client user to verify that the client user has collected the necessary signed forms from the person, as well as the person's identifying information, which may be pulled directly from the third-party application user interface 103 using a set of components, such as a regular expression template, as discussed above. If the client user cannot verify the necessary signed forms have been collected, an error message may be sent to the dynamic stub 104 for display in the user interface 103. If the client user does verify the necessary signed forms have been collected, a report is ordered without including the applicant in the process.

As is known in the art, a webpage includes, among its characteristics, a uniform resource locator (URL) or an equivalent of a URL. A URL (or equivalent) may be human readable and can also serve to enable various computer systems to identify a source, destination, or midpoint of a communication, and to route communication to/through/from a location associated with the particular URL. When the client user orders the report, the dynamic stub 104 sends the data as well as the URL of the third-party application user interface 103 to the middleware system 16. The message and control component generated by and sent from the middleware system 16 will include the URL sent from the dynamic stub 104. The control component opens the URL the client user originally ordered the search from and opens the dynamic stub 104 to view the results.

The dynamic stub 104 may also include different sections to, for example, display results of recent searches ordered. These recent searches may be separated by pending and completed orders. The client user can use the tabs to turn on or off additional services, such as monitoring. The dynamic stub 104 provides full functionality of the vendor services, as if accessing a direct portal to the vendor service system.

The middleware system 16 may have the ability to monitor an applicant's personal identifying information and file number from a previous report and be alerted if a new data point relevant to the report is located. The client user may then be notified through email and/or the dynamic stub 104 may present the option to the client user to rerun the report. The dynamic stub 104 may limit the ability to select monitoring of the application to an administrative account, since this monitoring service may cost an additional amount of money. In another embodiment, applicant monitoring may be triggered (or de-triggered) based upon the stage of the applicant. For example, monitoring may be triggered once an applicant moves from an initial stage to a successive stage, or may be de-triggered by demoting an applicant (setting a "reject" flag, for example).

To use the dynamic stub 104, a client user may be required to have an account. An administrator of the middleware system 16 can create, modify and delete client accounts and client users, as needed. For example, for a new client, the administrator can create an account for the client, subaccount, packages, positions, and locations, and add client users to the client account. Each client user may be required to have access credentials, e.g., a username and password, to access the account, including administrative client users. The administrator of the middleware system 16 can perform searches on client accounts and what reports have been ordered. The administrator of the middleware system 16 can also search the middleware system 16 by names, emails, and file numbers, or other data. If data is not available in the middleware system 16 to create a report, then the middleware system 16 may communicate with an outside source to receive data to use in the preparation of a report. In some embodiments, the middleware system 16 may obtain additional information via an API of an outside service, including accessing an API for the third-party application system 10.

An example use case of the ADAS 100 is as follows. A client user may be on a third-party application system user interface 103 looking at information regarding an applicant. The dynamic stub 104 scans the user interface 103 and exports data from fields determined from, for the present example, a regular expression template and send this information to the middleware system 16. The middleware system 16 determines whether a report has been ordered for that user and sends a message and control component back to the dynamic stub 104 based on the determination. The dynamic stub 104 may modify its icon 560 (in FIG. 5B), its control component 652 (in FIG. 6B), 658a, 658b, etc. (in FIG. 6C), 672 (in FIG. 6D), or a combination thereof, or the third-party application user interface (502 in FIGS. 5A-6B, 702 in FIGS. 6A-7D) based on the message and control component received from the middleware system 16. The client user may then see whether a report has been ordered. If a report has not been ordered, the client user can activate (press, click) the control component to order a search. The information that is sent to the middleware system 16 is displayed to the client user. The data and information sent to the middleware system 16 includes URL of the user interface 103 of the third-party application system 10 that the data was exported from. When the results are available, the middleware system 16 may email the client user (or otherwise send notification) to alert the client user of the completed report along with a control component that takes the client user to the URL of the user interface 103 of the third-party application system 10 the client user was on when the report was ordered, as well as displaying the report in the dynamic stub 104 or on the third-party application system user interface 103 itself.

Some third-party application systems 10 do not control which vendors provide integration with the third-party application system 10 and allow vendors to develop their own solutions and publish them to a marketplace of the software to be integrated into the third-party application system 10. In such embodiments, the ADAS 100 may be configured to interact with data in the third-party application system 10, allowing a client to build their own custom packages, create automated workflows to order services, and receive results directly back into the third-party application system 10. The middleware system 16 may return, per a client's specification, an adjudication result which uses an employer's hiring matrix to determine what data on a report indicates a hirable or hire-risk applicant. This may be returned as a field that can be used to automate workflow for the client user. Thus, the application allows automation for a client user regarding both ordering a report and taking action based on the results.

Based on client specifications, account type, or other client-related status, the template library 232 and/or data container library 234 may be configured to afford different reporting mechanisms via the dynamic stub 104. A template and/or set of data containers sent to the dynamic stub 104 may configure the dynamic stub 104 to provide data to the middleware system 16 based on the type of report to be run. Different data may be provided based on the different types of reports. Reports may include, by way of example without limitation, background checks, credit reports, employment verification, education verification, professional license verification, drivers license verification, Department of Motor Vehicles information, social security number trace, a personality assessment, etc.

Figure 5A:
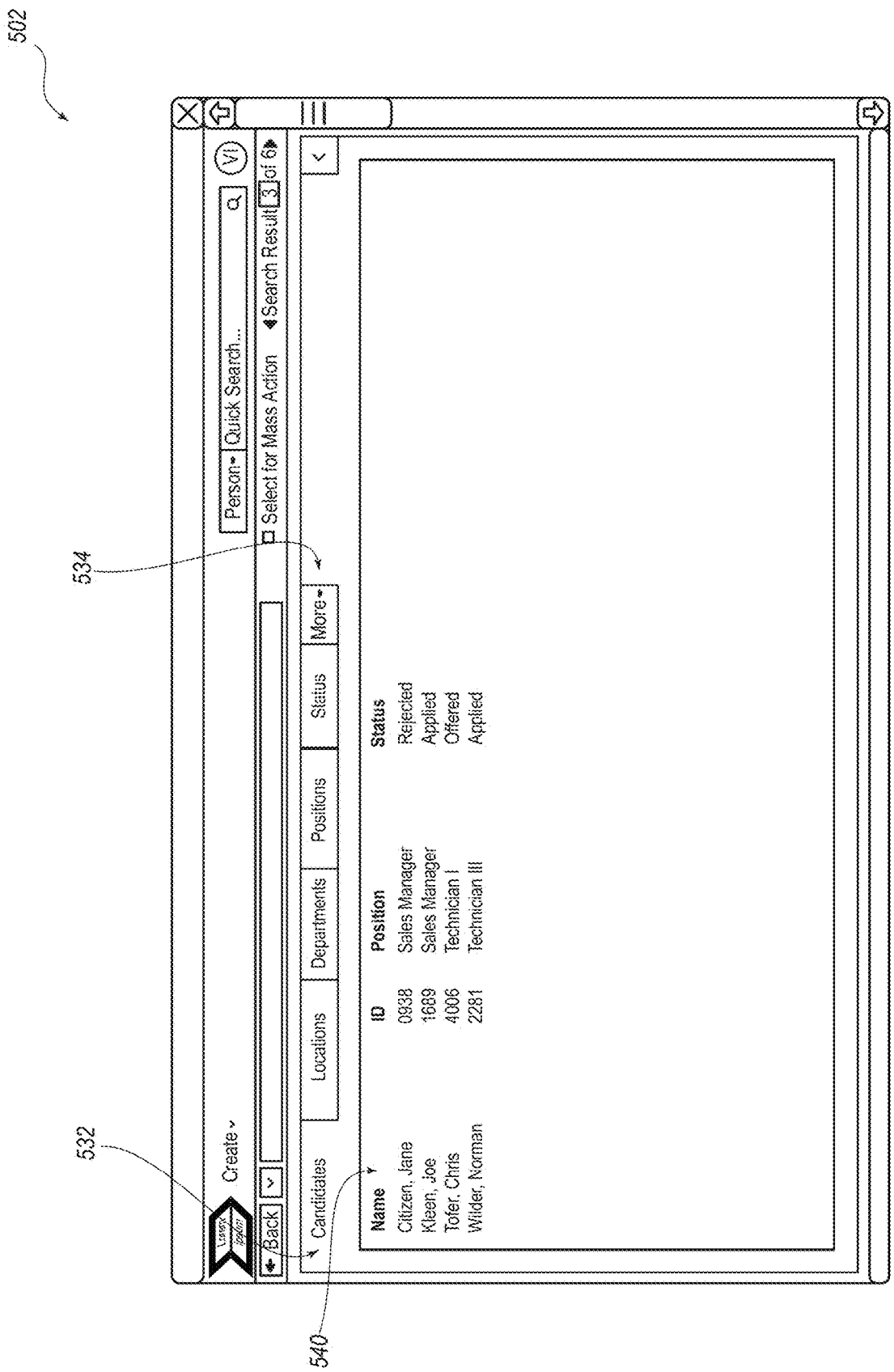
FIG. 5A is an illustration of a sample user interface of a third-party application system displayed on a client computing device display without a dynamic stub of the present disclosure.

FIG. 5A is an illustration of a sample user interface 502 of a third-party application system (such as the third-party application system 10 shown in FIG. 1) displayed on a client computing device (such as the client computing device 101 shown in FIG. 1) without a dynamic stub of the present disclosure. The user interface 502 includes at least one human-readable data display region 532. The data display region 532 includes one or more control components 534 which trigger behavior specified by the third-party application system 10. In this example diagram, the data display region 532 includes a list of names 540 of applicants for employment with the client and some related data.

FIG. 5B is the user interface 502 of FIG. 5A including a dynamic stub (such as the dynamic stub 104 of FIG. 1), according to an embodiment of the present disclosure. In this example, the dynamic stub 104 is configured to provide the user interface 502 at least one data display region 532 and at least one control component 534 to trigger behavior defined by the third-party application system 10, and a list of names 540 of applicants. The data display region 532 may include an icon 560 adjacent to each name in the list of names 540. Each icon 560 may enable access to functionality provided by the middleware system (see 16 in FIG. 1). The display of each icon 560 may be caused by injection of page markup language of the third-party application system 10 by the dynamic stub 104 and/or the middleware system 16. The appearance of the icon 560 may vary to reflect the content of the particular page markup language expression(s) used and corresponding to data received from the middleware system 16 for each applicant name in the list of names 540. By way of example, when a client user loads a webpage identified as a user interface of a third-party application system 10, the dynamic stub 104 may communicate with the middleware system 16 and provide data extracted from the user interface 502 of the third-party application system 10. The middleware system 16 may return a template and/or data containers and data to configure the dynamic stub 104 to display particular elements (such as text, control components, etc.) at targeted locations within the webpage of the third-party application system 10 so that the user interface 103 will display the icon 560 next to each name in the list of names 540. The page markup language expression(s) corresponding to each name in the list of names 540 may cause the icon 560 to have an appearance corresponding to some condition within the middleware system 16 relative to the individual name within the list of names 540 next to which the icon 560 appears. For example, if no report has been requested for one applicant, the page markup language may cause the icon 560 to be gray. If a report has been requested for an applicant but is not yet complete, the icon 560 may be yellow, for example. If a report has been completed for an applicant, the icon 560 may be green. By causing the icon 560 to display in different colors (and/or other variations) corresponding to the particular conditions defined by the middleware system 16, a client user may be able to quickly ascertain the status of reports regarding each of the applicants in the list of names 540 without needing to view each individual record separately.

Figure 6A:
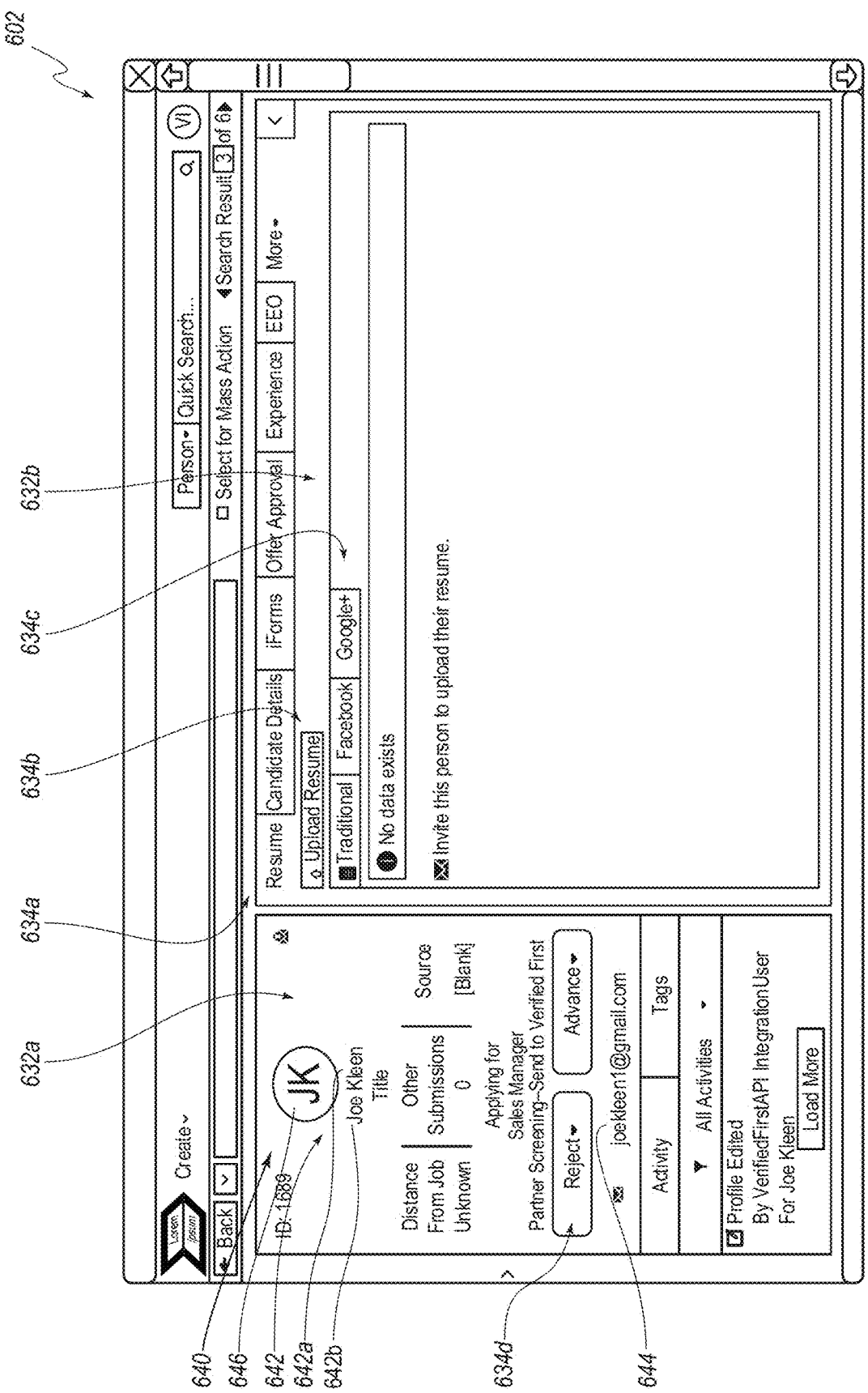
FIG. 6A is an illustration of a sample user interface of a third-party application system displayed on a client computing device without a dynamic stub of the present disclosure.

FIG. 6A is an illustration of a sample user interface 602 of a third-party application system (such as the third-party application system 10 shown in FIG. 1) displayed on a client computing device (such as the client computing device 101 in FIG. 1), without a dynamic stub of the present disclosure. FIG. 6A may correspond to a single applicant from the list of names 540 presented by the user interface 502 in FIG. 5A or FIG. 5B. The user interface 602 may include multiple human-readable data display regions 632a, 632b, etc., as defined by the third-party application system 10. The user interface 602 may include a number of control components 634a, 634b, 634c defined by the third-party application system 10 to provide functionality for interaction with the third-party application system 10. At least one data display region 632a, 632b, etc., includes an applicant data region 640. The applicant data region 640 includes at least a name 642 of an applicant. The name 642 may comprise a last name 642a and a first name 642b. The applicant data region 640 may include other data points related to the applicant, such as a photograph 646, an email address 644, etc. Other data points may be embedded within the page markup language which is used to display information within the user interface 602, but which may be contained within page markup language that does not display in the user interface 602. For example, an applicant's Social Security Account Number (SSAN), a System ID (SID), or a globally unique ID (GUID), which frequently may be used to aid identity, may be included in the underlying page markup language as a named variable that is not displayed, possibly for security reasons.

Figure 6B:
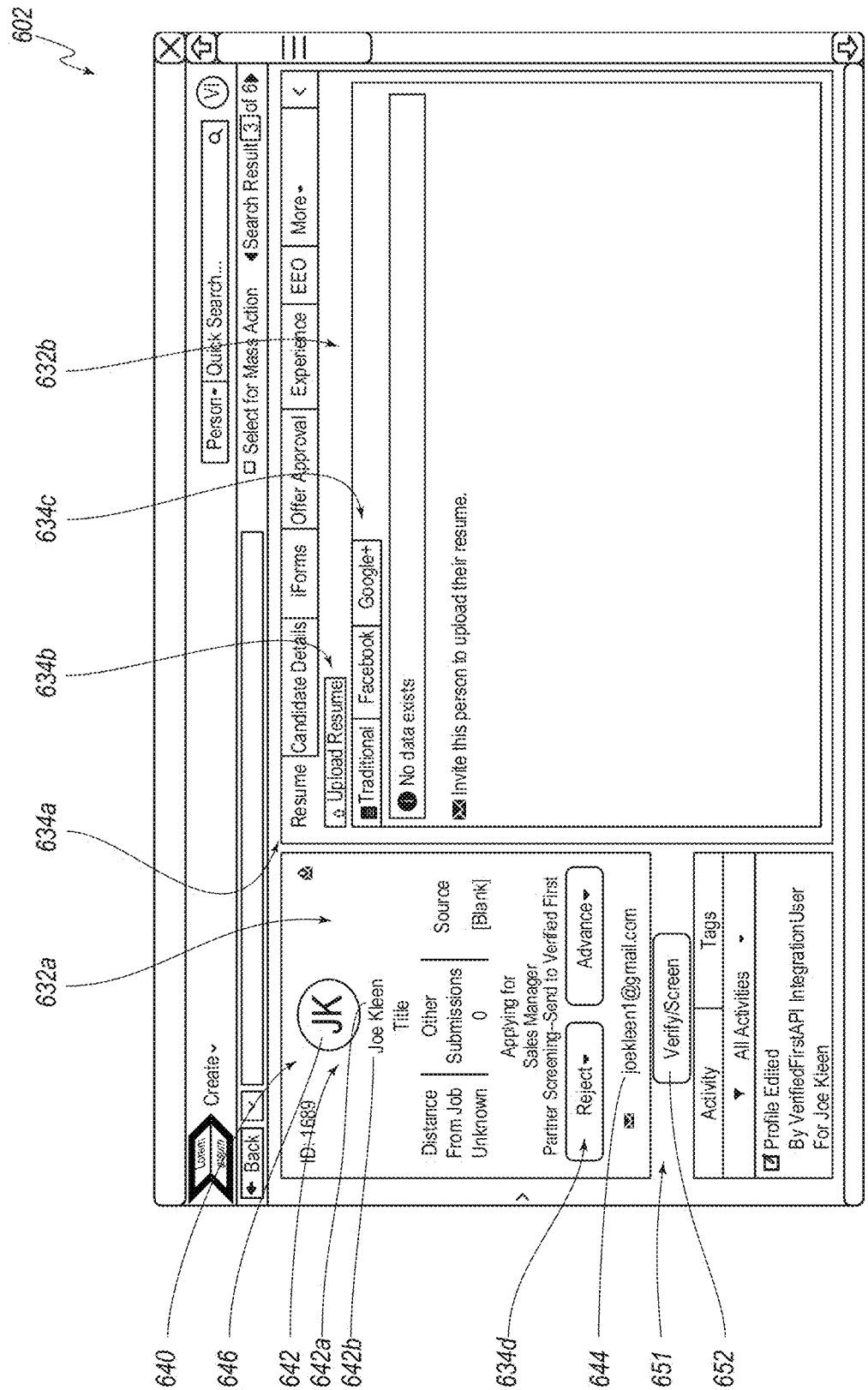
FIG. 6B is the user interface of FIG. 6A with a dynamic stub, according to an embodiment of the present disclosure.

FIG. 6B is the user interface 602 of FIG. 6A with a dynamic stub (such as the dynamic stub 104 shown in FIG. 1), according to an embodiment of the present disclosure. The dynamic stub 104 may be configured, via a template and/or data containers from the middleware system 16, to cause the user interface 602 to display one or more human-readable data display regions 632a, 632b, etc. defined by the third-party application system 10, control component(s) 634a, 634b, etc. defined by the third-party application system 10, and at least one applicant data region 640. The applicant data region 640 illustrated includes the applicant name 642, comprising the last name 642a and the first name 642b; the email address 644; and may contain the photograph 646. The underlying page markup language may also contain additional data points corresponding to the applicant, such as an SSAN, SID and/or GUID.

The user interface 602 of FIG. 6B may be one with which the client user has not interacted once the user interface 602 was presented. In other words, as seen in FIG. 6B, the client user may not have clicked or otherwise interacted with any element of the user interface 602.

In FIG. 6B, the dynamic stub 104 has injected page markup language to cause a control component 652 related to the middleware system 16 to be displayed at location 651 configured by the middleware system 16. In other words, the dynamic stub 104 may modify the user interface 602 by inserting a control component 652, which may be a button, text or, as shown in FIG. 6B, a graphical icon, or any combination of these elements. In an embodiment using a graphical icon for the control component 652, the page markup language causing the control component to display may configure (select for display) an icon which corresponds to the condition or status of a report on the middleware system 16 for the current applicant, similar to the icon 560 of FIG. 5B. The appearance and behavior of the control component 652 may be configured by a message from the middleware system 16. The client user may interact with the control component 652 to trigger one or more behaviors defined by the middleware system 16. For example, if no report regarding the current applicant has been previously requested, the control component 652 icon may be gray, and the client user may click on the control component 652 to request a report. If a report was previously requested but is incomplete, the client user may hover over the control component 652, which may trigger a display of relevant information, such as, for example, when the report was requested, or when the report is expected to be complete, etc., and the client user may click the control component 652 to view the report as currently constituted. If a report has been completed, the control component 652 icon may be green, and the client user may hover over the control component 652 which may trigger an indicator showing whether the report has been previously viewed, or when the report was completed, etc., and the client user may click the control component 652 to view the report, etc.

In at least one embodiment, the loading of the user interface 602 may trigger the dynamic stub 104 to request the corresponding template from the template library (232 in FIG. 2). The selected template may be employed by the dynamic stub 104 to scan the underlying page markup language to identify target data relative to the applicant and create a copy of the target data. Additionally, the dynamic stub 104 may identify stylistic characteristics of the user interface 602, and may cause elements injected to or displayed with third-party application system 10 elements to appear stylistically consistent. In other words, the dynamic stub 104 may employ font(s)/font style(s), color(s) for font(s) and menus, menus (drop down, fly out, pop up, pop down, etc.), and control components or other input components similar to those used in the user interface 602 of the third-party application system 10. For example, the dynamic stub 104 may match or approximately match the size, shape, color of buttons, fonts, font styles, font sizes, etc., used within the user interface 602 so as to appear stylistically consistent with the user interface 602. Said otherwise, the dynamic stub 104 may extract style information indicating a style of the user interface 602 and may configure a control component to the style of the user interface 602. A control component may include functionality for presenting a drop-down menu, a fly-out menu, a pop-up menu, etc., including a plurality of menu items, wherein selection of an item from the menu may initiate an interaction with the middleware system 16 based on extracted data from the user interface 602.

Figure 6C:
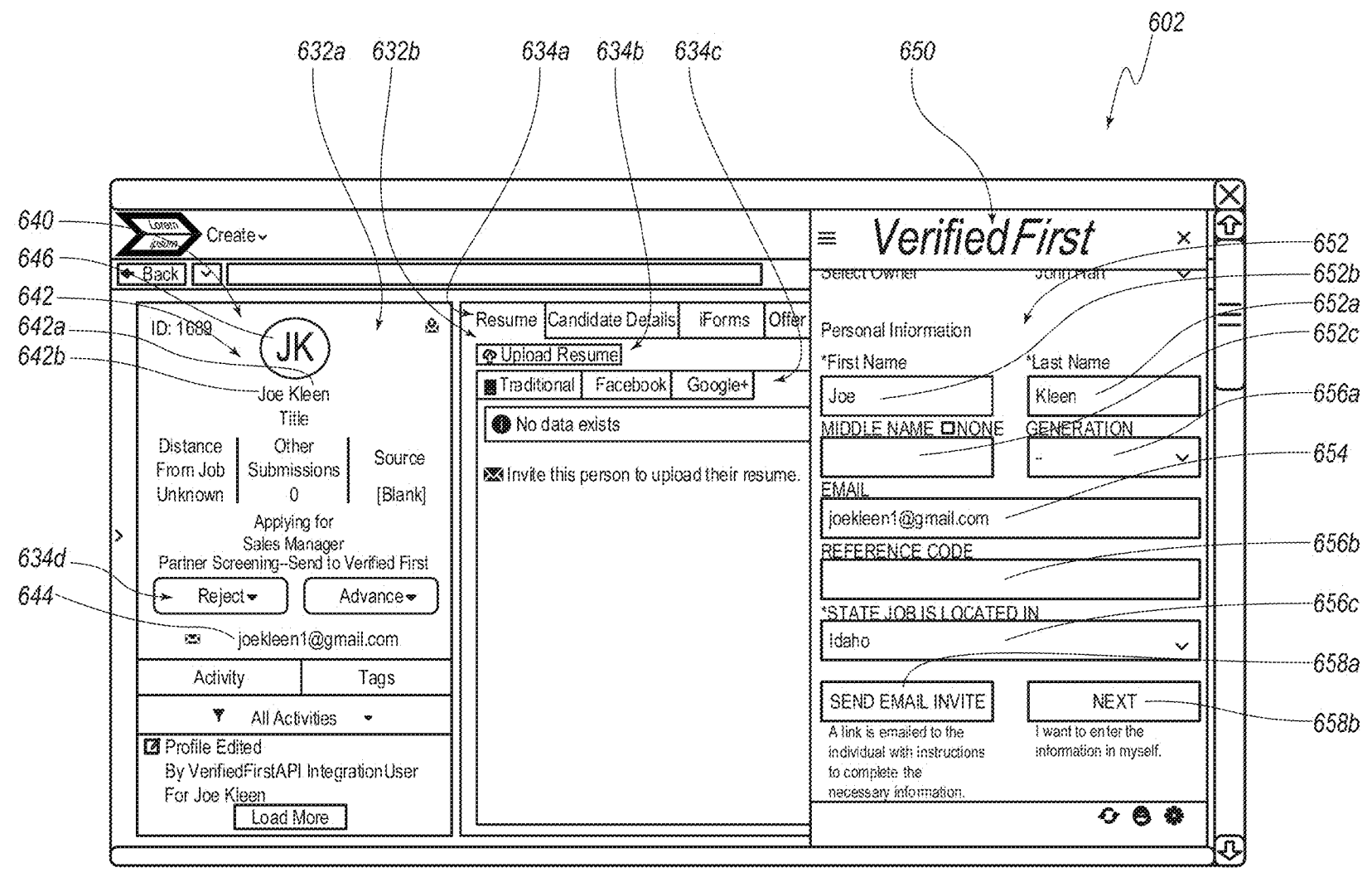

FIG. 6C is the user interface 602 of FIG. 6B with a data aggregation region 650 (e.g. a dynamic stub interface) provided by the dynamic stub 104. The user interface 602 of FIG. 6B is visible adjacent and "under" the data aggregation region 650. The user interface 602 includes one or more data display regions 632a, 632b, etc. and one or more control components 634a, 634b, etc. defined by the third-party application system 10, and the applicant data region 640. As in FIG. 6B, the applicant data region 640 displays the applicant name 642, comprising the last name 642a and the first name 642b; the email address 644; and the photograph or photograph placeholder 646. Additional applicant data points, such as SSAN, for example, may be contained within the underlying page markup language of the third-party application system 10 as named variables that are displayed.

FIG. 6C is an example of a modification of the user interface 602 resulting from an interaction, such as a click, of the control component 652 in FIG. 6B. The click of the control component 652 in FIG. 6B may trigger removal of the control component 652 and presentation of a data aggregation region 650. As discussed above, the loading of the user interface in FIG. 6B may have caused a copy of the target data relative to the applicant to be made. In another embodiment, clicking the control component 652 in FIG. 6A may cause the copy of the target data to be created. When the data aggregation region 650 appears, the various fields may be populated with the corresponding data, if any, found in the applicant data region 640 and underlying page markup language. In other words, an interaction with the middleware system 16 may include the dynamic stub (104 in FIG. 1, 204 in FIG. 2) opening a data aggregation region (dynamic stub interface) 650 and pre-populating a portion of the data aggregation region 650 to include extracted data from the user interface 602. For example, the last name 642a is copied to a last name field 652a, the first name 642b is copied to a first name field 652b, the email address 644 is copied to an email field 654, and other data may be copied to additional fields 656a, 656b, etc. of the data aggregation region 650. The data aggregation region 650 may include additional control components to allow the client user further interaction. For example, one control component 658a, 658b, etc. may allow the client user to manually enter additional data. Another control component 658a, 658b, etc. may allow the client user to generate an email to the applicant, an applicant screener, or some other person. Yet another control component 658a, 658b, etc. may allow the client user to send a request to the middleware system 16 to request a report, cancel a report request, request an updated report, etc.

Figure 6D:
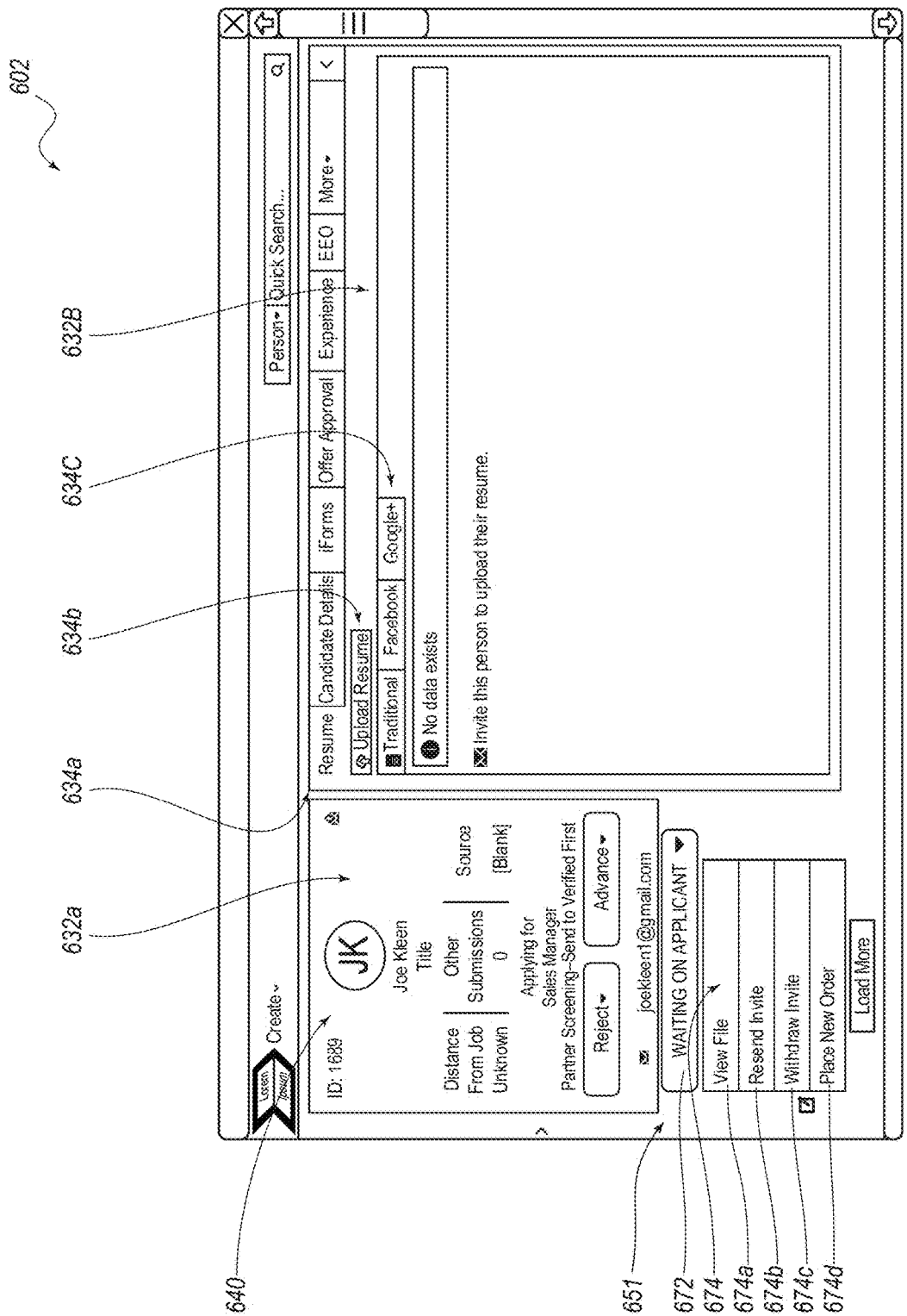
FIG. 6D is the user interface with the dynamic stub, according to an embodiment of the present disclosure, at a subsequent stage or phase of operation.

FIG. 6D is the user interface 602 with the dynamic stub at a subsequent stage or phase of operation. The user interface 602 includes the one or more data display regions 632a, 632b, etc. and third-party application system 10 control components 634a, 634b, etc., and the applicant data region 640 of FIG. 6B. FIG. 6D illustrates an instance wherein a report has been requested of, completed by, and received from the middleware system 16. When the user interface 602 for this applicant loads, the dynamic stub 104 may receive a message (such as a template and/or data containers and data) from the middleware system 16 causing a control component 672 to be displayed at location 651 different from the control component 652 of FIG. 6B.

The control component 672 may be configured by the message from the middleware system 16 to have at least some different functionality compared to the control component 652 injected in FIG. 6B. For example, when the client user hovers a cursor over the control component 672 of FIG. 6D, a "pop down" menu 674 (meaning, the menu appears to pop down from the control component 672) may be displayed providing the client user a variety of interaction options as configured by the message from middleware system 16 received for this applicant. The options may be displayed as menu item control components 674a, 674b, etc. in the menu 674. One menu item 674a, 674b, etc. may cause the client file for the applicant to be displayed. One menu item 674a, 674b, etc. may generate a customizable email to invite the applicant to an interview or to schedule/reschedule an interview. One menu item 674a, 674b, etc. may generate a customizable email (or other message) to one or more appropriate client personnel (supervisors, for example) to review the applicant file, to schedule/reschedule an interview, etc. In some instances, a menu item 674a, 674b, etc. may be configured to spawn a "fly out" submenu (meaning the submenu appears to fly out to the side of menu item) with additional interaction options which may be available to the client user based on the message received from the middleware system 16 for the particular applicant and stage of the application process.

Figure 7:
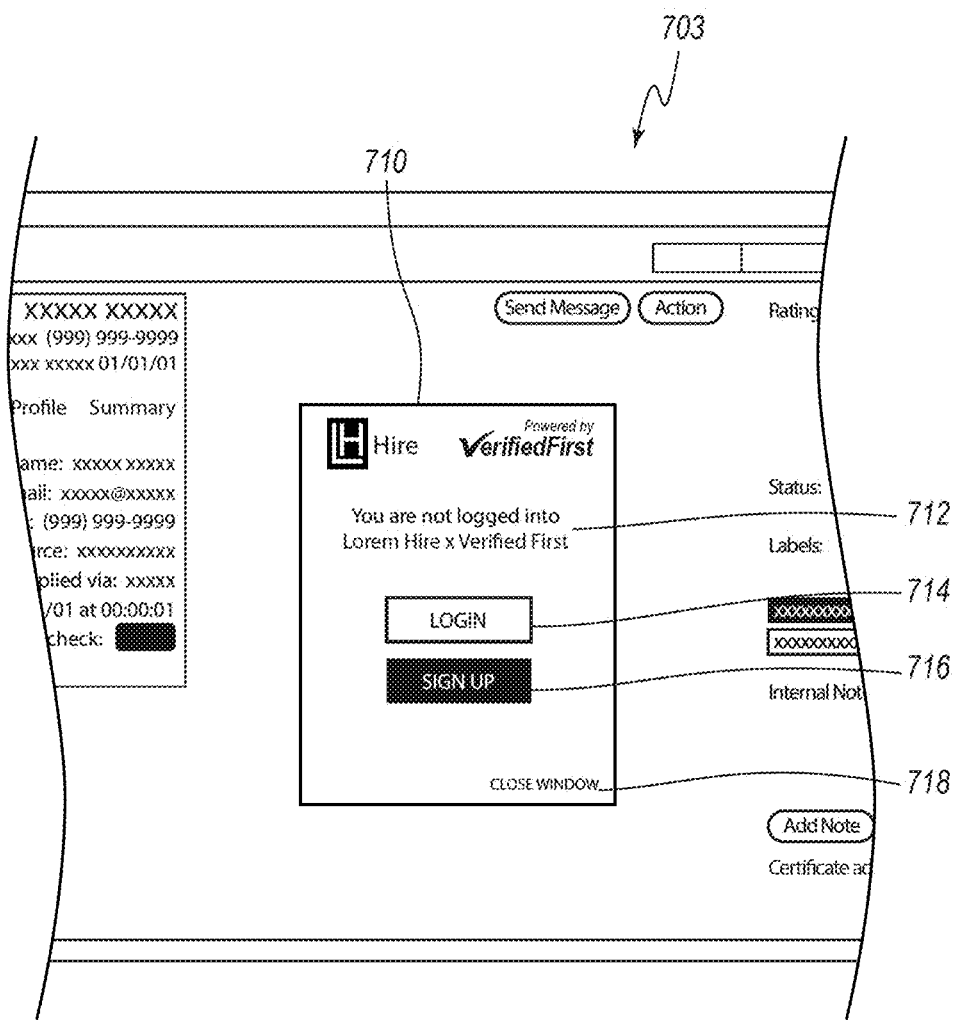
FIG. 7 illustrates a portion of a user interface having a dynamic stub, according to an embodiment of the present disclosure, wherein the dynamic stub is presenting a login/registration dialog.

FIG. 7 illustrates a portion of a user interface 703 having a dynamic stub (see 104 in FIG. 1), according to an embodiment of the present disclosure, wherein the dynamic stub 104 is presenting a login/registration dialog 710. A user may initially access the ADAS 100 by loading a webpage containing the dynamic stub 104 without first logging into to the ADAS 100. The present disclosure generally refers to a user interface presented as a webpage; however, a user interface may take the form of a webpage, or be a similar presentation within a dedicated system that may in some ways mimic behavior of a webpage. When the user who has not logged into the ADAS 100 interacts with a control component of the webpage, such as by clicking on a button, the dynamic stub 104 may cause the login/registration dialog 710 to appear. The dialog 710 may display a message 712 informing the user that the user has not logged in to use the ADAS 100. The dialog 710 may include a login button 714, a registration button 716, and a dismiss button 718. The user may click the login button 714, which may cause a second dialog (not shown) to appear which will permit the user to login to the ADAS 100. In one embodiment, during the login process, the contents of the webpage that caused the login/registration dialog 710 to appear is preserved. In another embodiment, during the login process, the contents of the webpage which caused the login/registration dialog 710 to appear may be obscured. In one embodiment, the underlying page markup language may include an encryption model to obscure personally or corporately identifiable data until the user successfully logs in. Once logged in, the client user may continue to use the ADAS 100 normally (e.g., submit the form). If a user is not registered to use the ADAS 100, the user may click the register button 716.

Clicking the registration button 716 may cause another dialog (not shown) to appear, which will permit the client user to enter appropriate registration data. The registration data may comprise a set of personally identifiable information, a payment method, and any other data needed to associate the client user to a client account within the ADAS. Once the client user has registered and logged in, the client user may continue to use the ADAS 100 normally (e.g., submit the form). If the user begins the registration process but does not complete the registration process, the dynamic stub 104 may capture any data that the user entered into the fields of the registration form and send that data to the middleware system 16. The middleware system 16 may be configured to provide the incomplete registration to an employee of the middleware service 16. The employee may, if enough data was captured, then contact the user to offer assistance or information regarding the ADAS 100. Clicking the dismiss button 718 may cause the login/registration dialog 710 to disappear from the user interface 703, and may also cause the user-entered information in the form from which the login/registration dialog 710 was triggered to be erased. A first state dynamic stub 104 may loaded such that the user interface 703 is returned to a first, data-free condition.

Example Embodiments

The following are some example embodiments within the scope of the disclosure. In order to avoid complexity in providing the disclosure, not all of the examples listed below are separately and explicitly disclosed as having been contemplated herein as combinable with all of the other examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1. A system for amalgamating data of a third-party application system, comprising: a dynamic stub to operate with a user interface application of the third-party application system to be presented for a user viewing on a client computing device, the user interface to provide remote interaction with the third-party application system, the dynamic stub associated with a middleware system, the dynamic stub to, on the client computing device: extract data from the user interface based on a regular expression template; transmit the data to the middleware system; receive information from the middleware system; and alter at least a portion of the user interface based on the information received from the middleware system.

Example 2. A system for amalgamating data of a third-party application, comprising: a middleware system to communicate with a client computing device; and a dynamic stub associated with the middleware system, the dynamic stub to, on the client computing device: obtain a regular expression template based on one or more characteristics of a webpage that is provided to the client computing device by the third-party application system; extract data from the webpage based on the regular expression template; transmit the data to the middleware system; receive information from the middleware system; and modify the webpage based on the information received from the middleware system.

Example 3. A system for amalgamating data of third-party applications, comprising: a dynamic stub to operate with a browser application on a client computing device, the dynamic stub associated with a middleware system, the dynamic stub to, on the client computing device: extract data from a webpage based on a regular expression template, the webpage provided to the client computing device by the third-party application system; transmit data to the middleware system; receive information from the middleware system; and alter at least a portion of the webpage based on the information received from the middleware system.

Example 4. The system of any of Examples 1-3, wherein the dynamic stub is further to obtain the regular expression template based on one or more characteristics of the user interface that is provided to the client computing device by the third-party application system.

Example 5. The system of any of Examples 1-3, wherein altering at least a portion of the user interface includes inserting a control component integrated into user interface.

Example 6. The system of Example 5, wherein the control component is a button.

Example 7. The system of Example 6, wherein the dynamic stub extracts style information indicating a style of the user interface and wherein the control component is integrated into the user interface by matching an appearance (e.g., size, shape, color, font) of the control component to the style of the user interface.

Example 8. The system of Example 5, wherein the control component includes functionality for presenting a drop-down menu including a plurality of menu items, wherein selection of a menu item of the plurality of menu items initiates an interaction with the middleware system based on extracted data from the user interface.

Example 9. The system of Example 8, where the interaction with the middleware system includes opening a dynamic stub interface and/or data aggregation region (e.g., within the user interface) and pre-populating a portion of the dynamic stub interface and/or data aggregation region to include extracted data from the user interface.

Example 10. The system of any of Examples 1-3, wherein the user interface comprises a webpage.

Example 11. The system of Example 10, wherein the dynamic stub is configured to alter the user interface by identifying a section of page markup language (e.g., HTML) of the webpage and inserting a new additional section of page markup language.

Example 12. The system of Example 11, wherein the new additional section of page markup language modifies the operation of a control component of the webpage to transmit extracted information to the middleware system.

Example 13. The system of Example 11, wherein inserting the new additional section of page markup language modifies an operation of a control component of the webpage.

Example 14. The system of Example 10, wherein the dynamic stub is configured to modify the webpage by identifying a section of page markup language of the webpage and suppressing the section of page markup language.

Example 15. The system of Example 10, wherein the one or more characteristics of the webpage comprise a uniform resource locator (URL) of the webpage.

Example 16. The system of Example 15, wherein the data transmitted to the middleware system includes the URL of the webpage.

Example 17. The system of Example 1, wherein the dynamic stub is configurable to a first state to provide data to the middleware system and reconfigurable by the middleware system from the first state to a subsequent state to alter at least a portion of the user interface and to provide additional data to the middleware system.

Example 18. A system for integrating with a third-party application system, comprising: a memory including a middleware database to store data to be used to compile reports; one or more processing units configured to: receive data from a dynamic stub operating with a browser application on a client computing device, the browser application presenting a webpage provided to the client computing device by the third-party application system, the data extracted from the webpage by the browser application; determine if a report is ordered based on the received data and data in the middleware database; and generate a message to send to the dynamic stub based on the determination, the message to be communicated by the dynamic stub to the browser for use with the webpage.

Example 19. The system of Example 18, wherein the message includes page markup language to be presented on the webpage.

Example 20. The system of Example 18, wherein the message includes page markup language to modify a section of the webpage.

Example 21. The system of Example 18, wherein the message includes a regular expression to identify a section of page markup language of the webpage.

Example 22. The system of Example 21, wherein the message includes an instruction to the dynamic stub to remove the identified section of page markup language of the webpage.

Example 23. The system of Example 21, wherein the message includes an instruction to the dynamic stub to insert additional page markup language at the identified section of page markup language of the webpage.

Example 24. The system of Example 18, wherein the message indicates one of: the report is complete; or the report is pending.

Example 25. A system for integrating with a third-party application system, comprising: a middleware system to communicate with a client computing device; and a dynamic stub associated with the middleware system, the dynamic stub to, on the client computing device: obtain a regular expression template from the middleware system based on one or more characteristics of a webpage that is provided to the client computing device by the third-party application system; extract data from the webpage based on the regular expression template; transmit the data to the middleware system; receive information from the middleware system; and modify the webpage based on the information received from the middleware system.

Example 26. The system of Example 25, wherein the one or more characteristics of the webpage comprise a URL of the webpage.

Example 27. The system of Example 26, wherein the data sent to the middleware system includes the URL of the webpage.

Example 28. The system of Example 25, wherein the dynamic stub is configured to modify the webpage by identifying a section of page markup language of the webpage and inserting a new additional section of page markup language.

Example 29. The system of Example 28, wherein inserting the new additional section of page markup language inserts (or injects) a control component integrated into the webpage.

Example 30. The system of Example 29, wherein the control component is a button.

Example 31. The system of Example 29, wherein the browser extension extracts style information indicating a style of the webpage and wherein the control component is integrated into the webpage by matching an appearance (e.g., size, shape, color, font) of the control component to the style of the webpage.

Example 32. The system of Example 29, wherein inserting the new additional section of page markup language modifies an operation of a control component of the webpage.

Example 33. The system of Example 29, wherein the new additional section of page markup language modifies the operation of a control component of the webpage to transmit extracted information to the middleware system.

Example 34. The system of Example 25, wherein the dynamic stub is configured to modify the webpage by identifying a section of page markup language of the webpage and suppressing the section of page markup language.

Example 35. A system for integrating and/or interfacing with a third-party application, comprising: a dynamic stub to operate with a user interface application on a client computing device, the dynamic stub associated with a middleware system, the dynamic stub to, on the client computing device: extract data from a user interface of the third-party application system based on a regular expression template, the user interface operable on the client computing device to interface with the third-party application system; transmit data to the middleware system; receive information from the middleware system; and alter at least a portion of the user interface based on the information received from the middleware system.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVDROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communication network. In a distributed computing environment, software modules may be located in local and/or remote memory storage devices. In addition, data being tied or rendered together in a database record may be resident in the same memory device, or across several memory devices, and may be linked together in fields of a record in a database across a network.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. A system, comprising:
  a dynamic stub in communication with a middleware device, the dynamic stub to operate within a user interface of a third-party application system, and the dynamic stub to:
    transmit, to the middleware device, a first set of data obtained from the user interface;
    receive, responsive to transmission of the first set of data obtained from the user interface, a second set of data from the middleware device, the second set of data including:
      first data corresponding to the user interface; and
      second data provided by the third-party application system, the second data appended to the second set of data by the middleware device; and
    alter, based on a template received from the middleware device, at least a portion of the user interface to include a control component.

2. The system of claim 1, wherein the control component includes at least one of a first component to extract data pertaining to a first portion of the second set of data or a second component to provide data pertaining to a second portion of the second set of data.

3. The system of claim 1, the dynamic stub to:
  obtain, responsive to alteration of the at least a portion of the user interface, a third set of data from the user interface; and
  transmit the third set of data to the middleware device to receive subsequent data from the middleware device.

4. The system of claim 1, the dynamic stub to:
  receive, from the middleware device, the template for display on the user interface; and
  provide, responsive to alteration of the at least a portion of the user interface, information obtained via the user interface.

5. The system of claim 1, the dynamic stub to:
  receive, from the middleware device, an update to the template, the update including a modification to the control component; and
  format, based at least one the update to the template, at least a portion of the second set of data for display in the user interface or for interaction in the user interface.

6. The system of claim 1, the dynamic stub to:
  receive, responsive to alteration of the at least a portion of the user interface, third data pertaining to at least a portion of the first set of data via the user interface; and
  update the user interface to display the third data.

7. The system of claim 1, the dynamic stub to:
  extract, responsive to alteration of the at least a portion of the user interface, a first portion of the second set of data; and
  update the user interface to indicate extraction of the first portion of the second set of data.

8. A method, comprising:
  transmitting, to a middleware device by one or more processing circuits, a first set of data obtained by a dynamic stub from a user interface presented by the one or more processing circuits, the dynamic stub operating within the user interface;
  receiving, by the one or more processing circuits responsive to transmission of the first set of data obtained from the user interface, a second set of data from the middleware device, the second set of data including:

first data corresponding to the user interface; and
second data provided by a third-party application system, the second data appended to the second set of data by the middleware device; and
altering, by the one or more processing circuits based on a template received from the middleware device, at least a portion of the user interface to include a control component.

9. The method of claim 8, wherein the control component includes at least one of a first component to extract data pertaining to a first portion of the second set of data or a second component to provide data pertaining to a second portion of the second set of data.

10. The method of claim 8, comprising:
obtaining, by the one or more processing circuits responsive to altering the at least a portion of the user interface, a third set of data from the user interface; and
transmitting, by the one or more processing circuits, the third set of data to the middleware device to receive subsequent data from the middleware device.

11. The method of claim 8, comprising:
receiving, by the one or more processing circuits from the middleware device, the template for display on the user interface; and
providing, by the one or more processing circuits responsive to alteration of the at least a portion of the user interface, information obtained via the user interface.

12. The method of claim 8, comprising:
receiving, by the one or more processing circuits from the middleware device, an update to the template, the update including a modification to the control component; and
formatting, by the one or more processing circuits based at least one the update to the template, at least a portion of the second set of data for display in the user interface or for interaction in the user interface.

13. The method of claim 8, comprising:
receiving, by the one or more processing circuits responsive to alteration of the at least a portion of the user interface, third data pertaining to at least a portion of the first set of data via the user interface; and
updating, by the one or more processing circuits, the user interface to display the third data.

14. The method of claim 8, comprising:
extracting, by the one or more processing circuits responsive to alteration of the at least a portion of the user interface, a first portion of the second set of data; and
updating, by the one or more processing circuits, the user interface to indicate extraction of the first portion of the second set of data.

15. One or more non-transitory storage media storing instructions thereon that, when executed by one or more processors, cause the one or more processors to perform operations comprising:
transmitting, to a middleware device, a first set of data obtained from a user interface;
receiving, responsive to transmission of the first set of data obtained from the user interface, a second set of data from the middleware device, the second set of data including:
first data corresponding to the user interface; and
second data provided by a third-party application system, the second data appended to the second set of data by the middleware device; and
altering, based on a template received from the middleware device, at least a portion of the user interface to include a control component.

16. The one or more non-transitory storage media of claim 15, wherein the control component includes at least one of a first component to extract data pertaining to a first portion of the second set of data or a second component to provide data pertaining to a second portion of the second set of data.

17. The one or more non-transitory storage media of claim 15, wherein the instructions cause the one or more processors to perform operations comprising:
obtaining, responsive to alteration of the at least a portion of the user interface, a third set of data from the user interface; and
transmitting the third set of data to the middleware device to receive subsequent data from the middleware device.

18. The one or more non-transitory storage media of claim 15, wherein the instructions cause the one or more processors to perform operations comprising:
receiving, from the middleware device, the template for display on the user interface; and
providing, responsive to alteration of the at least a portion of the user interface, information obtained via the user interface.

19. The one or more non-transitory storage media of claim 15, wherein the instructions cause the one or more processors to perform operations comprising:
receiving, from the middleware device, an update to the template, the update including a modification to the control component; and
formatting, based at least one the update to the template, at least a portion of the second set of data for display in the user interface or for interaction in the user interface.

20. The one or more non-transitory storage media of claim 15, wherein the instructions cause the one or more processors to perform operations comprising:
receiving, responsive to alteration of the at least a portion of the user interface, third data pertaining to a second portion of the first set of data via the user interface; and
updating the user interface to display the third data.

* * * * *